C. W. & W. W. MARSH.
RAISING AND LOWERING DEVICE FOR HARVESTERS.

No. 178,539. Patented June 13, 1876.

WITNESSES:
P. C. Dieterich
T. H. Duffy

INVENTORS:
Charles W. Marsh
William W. Marsh

N. PETERS, PHOTO-LITHOGRAPHER, WASHINGTON, D. C.

UNITED STATES PATENT OFFICE.

CHARLES W. MARSH AND WILLIAM W. MARSH, OF SYCAMORE, ILLINOIS.

IMPROVEMENT IN RAISING AND LOWERING DEVICES FOR HARVESTERS.

Specification forming part of Letters Patent No. 178,539, dated June 13, 1876; application filed January 10, 1876.

*To all whom it may concern:*

Be it known that we, CHARLES W. MARSH and WILLIAM W. MARSH, of Sycamore, De Kalb county, State of Illinois, have invented new and useful Improvements in Raising and Lowering Devices for Harvesters, of which the following is a full description, reference being had to the accompanying drawings, in which—

Figure 1:
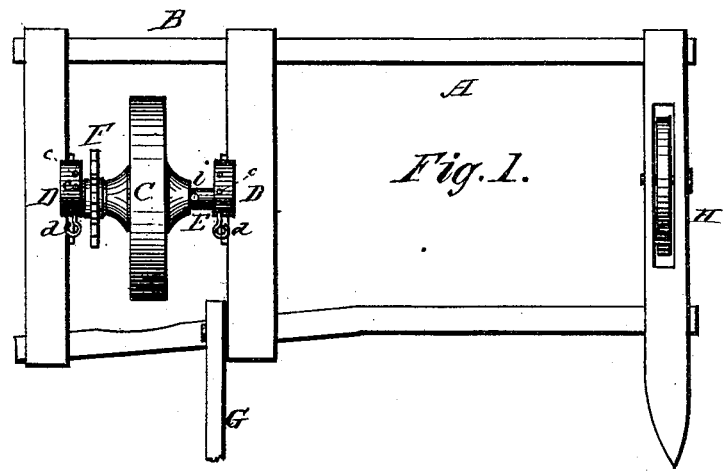
Figure 2:
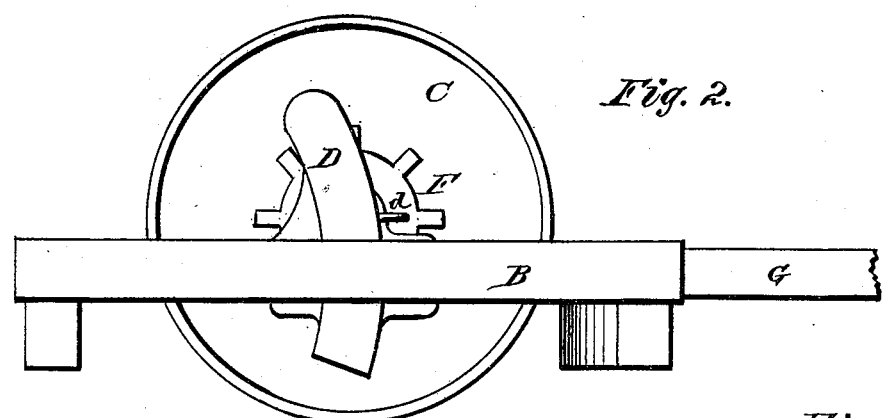
Figure 4:
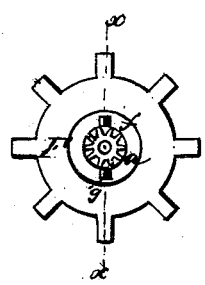
Figure 3:
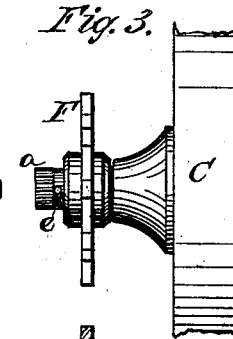
Figure 5:
Figure 6:
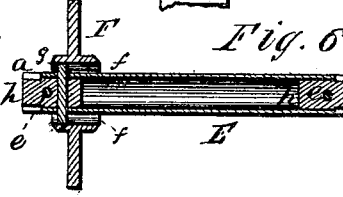

Figure 1 is a top or plan view; Fig. 2, a side view; Figs. 3 and 4, enlarged details showing the hand-wheel for raising and lowering; Fig. 5, enlarged details of the rack-gearing; Fig. 6, a section of the axle enlarged.

This invention relates to harvesters, and consists in the improvement of the several parts and combination of parts hereinafter set forth and claimed as new.

The frame A B may be made in any suitable manner. The part of the frame shown at A is designed to receive a grain-carrier, and the frame B receives and is supported upon the main wheel C, over which an elevator is placed, as in the ordinary construction of this class of machines. The cross-bars are provided with brackets D, which are constructed with flanges, so as to be strongly attached, and with cog-racks $b$, as shown in the details, Fig. 5. The small pinions $a$ on the ends of the axle of the main or drive wheel C are made to engage with these racks $b$; and they are operated by the hand-wheel F, which is attached to the axle, and secured thereto by means of a pin, $g$, as shown at Fig. 1. This hand-wheel is located between the rack D and the main wheel C, so as to be out of the way. The axle E is made hollow, which enables its size and strength to be increased without increasing its weight. The pinions $a$ are provided with stubs or projections $h$, which fit into the hollow of the axle, as shown at Fig. 6. By this construction of the axle the necessity of turning is avoided, and the pinions can be made of cast-iron; or they may be made of wrought-iron, with cut gearing, separately, and when the pinions are inserted the whole forms as strong and compact an axle as though it had been made solid and turned. The side castings D, or racks, are provided with holes $c$, arranged to receive pins $d$, which pins not only pass through the holes $c$, but also through the holes $e$ of the axle, so that each half turn of the hand-wheel F raises or lowers the frame-work one step. These pins $d$ prevent the spreading apart of the brackets or side castings D, and they also support the axle E, so that it does not rest upon and wear the cog-gearing. It will be seen by this arrangement that the axle E does not turn, and that the main wheel C revolves upon the axle, instead of with it.

The hand-wheel F, as shown, is provided with handles; but, instead of handles, holes may be made in the periphery, and the wheel can then be operated by detachable levers, in which case it may be made somewhat smaller.

The tongue G, grain-wheel H, cutting apparatus, and the other attachments which complete a harvesting-machine, are, of course, to be added; but as they form no part of the invention here shown, they are not shown or described.

A convenient way of attaching the hand-wheel F is by cutting in the hub of said wheel a slot or groove, $f$, which slips over a pin fitting therein, so that by first slipping the wheel F on the axle and applying the driving-wheel C, it will be locked in place, and firmly held on the axle E.

The driving-wheel is held, or prevented from moving on the axle E, by the hub of the hand-wheel F, and by a pin, $i$, shown at Figs. 1 and 3, or other suitable device. This arrangement makes a strong and durable raising and lowering device, which is easily operated, prevents the frame-work from spreading, and relieves the rack and pinion gear from excessive or even ordinary wear.

In operation, at each half turn of the hand-wheel F the holes $c$ in the side castings D, and the holes $e$ in the axle E, are made to correspond, when the pins $d$ are inserted, and the machine thereby made to run a considerable distance from, or very close to, the ground, as desired.

What we claim as new, and desire to secure by Letters Patent, is as follows:

The pinions $a$, provided with stubs or projections $h$, in combination with a hollow axle, substantially as and for the purpose specified.

CHARLES W. MARSH.
WILLIAM W. MARSH.

Witnesses:
A. M. STARK,
W. Z. DAFOE.